Aug. 22, 1967 W. C. ARNOLD 3,337,277
FIFTH WHEEL COUPLING FOR LAND VEHICLES
Filed Oct. 23, 1965

INVENTOR.
WALTER C. ARNOLD
BY Boyce C. Dent
his Attorney

United States Patent Office 3,337,277
Patented Aug. 22, 1967

3,337,277
FIFTH WHEEL COUPLING FOR LAND VEHICLES
Walter C. Arnold, Ellicott City, Md., assignor to Koppers Company, Inc., a corporation of Delaware
Filed Oct. 23, 1965, Ser. No. 503,153
1 Claim. (Cl. 308—136)

ABSTRACT OF THE DISCLOSURE

A fifth wheel coupling assembly for tractor-trailer vehicles having a relatively thin self-lubricated veneer of filled polytetrafluoroethylene secured to the bottom of the trailer plate portion of the coupling.

---

Figure 1:
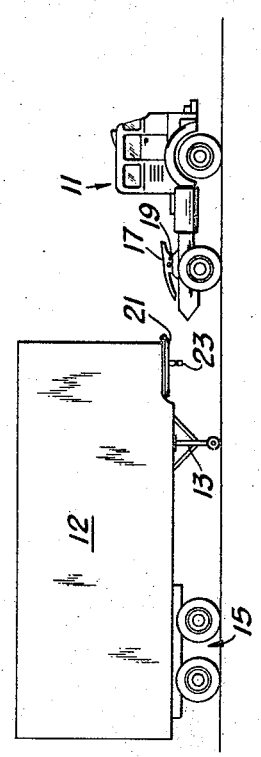

This invention relates generally to trailer plates for semi-trailer fifth wheel couplings.

Semi-trailers are conventionally coupled to motivating tractors by means of a fifth wheel coupling. This coupling comprises a flat metal plate, known as a trailer plate, rigidly secured to the forward underside of the trailer in the approximate center of which a downwardly extending hinge or king pin is rigidly fixed. A corresponding metal plate is hinge mounted to the rear top side of the tractor and has in it a centrally located hole extending to the rear edge of the plate for receiving the king pin of the trailer. An upturned lip on the forward edge of the trailer plate is usually provided to guide the tractor plate under the trailer plate during coupling of the vehicles. A latch arrangement is provided to lock the king pin in the hole in the tractor plate once coupling is accomplished.

Since a great proportion of the load of the trailer is carried by the coupling plates, considerable sliding friction is generated by the almost constant relative rotation between the plates as the vehicle travels. Conventionally, the sliding load-bearing surfaces of the plates are greased to reduce the friction. However, the grease traps dirt and other foregin matter to which the coupling is subjected during road travel. Thus, the benefit of the grease is lost and, additionally, the combined dirt and grease acts as a grinding compound and would eventually wear out the plates if permitted to remain. The reduced lubrication also causes the tractor to be very difficult to steer. Consequently, the coupling must be cleaned and lubricated frequently, sometimes as often as once a day. Such frequent lubrication is both troublesome and expensive.

Accordingly, an object of the present invention is to provide a trailer plate for a fifth wheel coupling, which trailer plate requires little or no lubrication while providing a low frictional resistance between the load-bearing surfaces.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

Figure 2:
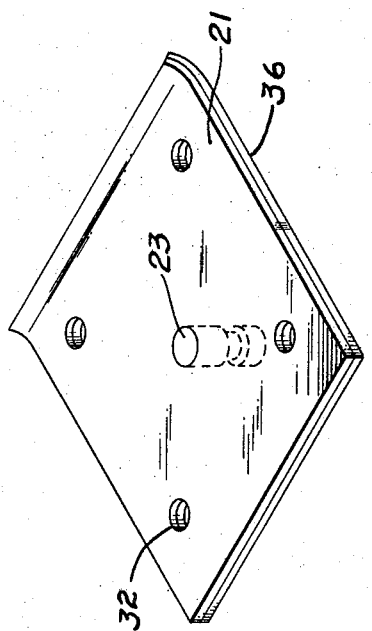

In the drawings wherein like parts are marked alike:

FIGURE 1 is a side elevation of a fifth wheel coupling in an uncoupled condition incorporating an embodiment of the invention, and FIGURE 2 is an isometric view of the trailer plate disassembled from the trailer.

Referring now to FIG. 1, there is illustrated a conventional tractor 11 and trailer 12 in an uncoupled state. Since the tractor 11 and trailer 12 are not coupled, the trailer 12 is supported by landing gear 13 and rear wheels 15. On the rear of the tractor is a conventional fifth wheel 17. This fifth wheel is an inclined position in the uncoupled state and is pivoted to the frame of the tractor by a pivot 19. Cooperating with the pivot is a trailer plate 21 that is secured to the trailer, for example, by a conventional means such as bolts. A king pin 23 depends from the trailer plate 21 for engagement in an aperture in the fifth wheel 17. This king pin is locked by a conventional means in this aperture thereby coupling tractor 11 and trailer 12 securely together. As this coupling takes place, of course, the fifth wheel 17 pivots about pivot point 19 to a horizontal position thereby mating with the underside trailer plate 21.

In operation the trailer and the tractor are almost constantly in a state of relative motion. Thus, considerable sliding friction is generated at the points of contact between trailer plate 21 and fifth wheel 17. This contact, of course, extends in the plane and through all the surfaces of the trailer plate 21 and fifth wheel 17. It has been conventional heretofore to grease the surfaces to reduce friction, but, as pointed out above, this has the grave disadvantage that the greaese traps dirt and foreign matter and that the grease may be lost due to the coupling and uncoupling of the various members, as the contents are removed and new contents are loaded onto the trailer 12.

It has now been discovered in accordance with this invention that the need for continual lubrication of the surface of the fifth wheel and the surface of the trailer plate can be eliminated with a filled polytetrafluoroethylene. Either the trailer plate or the fifth wheel or both, of course, may be laminated. In the preferred form, however, as illustrated for example in FIG. 2, the trailer plate includes a laminate of filled polytetrafluoroethylene.

The beneficial frictional and self-lubricating properties of polytetrafluoroethylene are well known. Also well known are the characteristic softness of polytetrafluoroethylene and its tendency to extrude from between the coacting plates when placed under pressure. These characteristics, of course, negate the use of palytetrafluoroethylene in fifth wheel couplings.

It has now been discovered that a particular combination of composition and thickness of composition can be used satisfactorily for a self-lubricated semi-trailer fifth wheel coupling, the composition utilizing polytetrafluoroethylene. The composition is a fibrous material, fiberglass, and a particulate material, especially carbon, which so increases the compressive resistance of the polytetrafluoroethylene to the point that it is practical to use the composition as a covering on the trailer plate, maintaining the slippery properties, provided that the thickness of the covering is within the critical limits. Surprisingly, the composition has wear resistance as well as extrusion resistance.

The preferred proportions of fibrous and particulate material to the polytetrafluoroethylene ranges from 15 percent to 35 percent by weight of the total weight. It is preferred that the fibrous and particulate material constitute about 25 percent of the total weight, as the wear and structural properties of the composition are at their highest value without detracting from the lubricating characteristics. Advantageously, the fibrous and particulate materials are used in equal proportions, although some variation is not detrimental. If less than about 15 percent fibrous and particulate material is used, the composition will extrude and wear too fast to be practical. If more than 35 percent is used, the composition will no longer serve as a non-lubricated veneer.

Although carbon is preferred as the particulate material, other particulate bearing materials, such as bronze or bronze and carbon, may be used. If desired, a solid lubricant, such as polydisulfide, may be added to reduce further the coefficient of friction. The carbon may be in various forms, such as graphite or coke flour.

The thickness of the veneer is critical. A thickness exceeding 0.250 inch tends to extrude and become deformed because of the load carried by it. A thickness less than 0.030 inch becomes subject to abrasion caused by dirt or other foreign matter which comes in contact with it, thereby rendering it ineffective. The optimum thickness has been found to be about 0.070 inch.

The veneer is preferably secured to the frictional surface of the trailer plate by means of an adhesive, although it is possible to secure it to the plate by mechanical means such as flat-head rivets. An adhesive that may be advantageously used is "Bond Master M777" made by the Pittsburgh Plate Glass Company. This adhesive is a thixotropic, room temperature-curing, two component epoxy adhesive and should be used in accordance with the instructions published by the manufacturer.

Referring now to FIG. 2, there is illustrated a trailer plate 21 removed from the trailer. The trailer plate is secured to the trailer in a conventional fashion, for example, by bolts passing through apertures 32 and secured to the trailer body. Extending from the trailer plate is, of course, the conventional king pin 23. Secured to the underside of the metal trailer plate 21 is the novel veneer 36 of this invention. As described above, this novel veneer is a fibrous material and a particulate material bonded by polytetrafluoroethylene. The veneer is of a thickness of from 0.030 to 0.250.

In the normal operation of the semi-trailer, the veneer bears against the fifth wheel. Due to the lubricating qualities or the anti-friction qualities of the veneer, no additional lubrication is necessary. This eliminates the dirty, greasy operation heretofore required to maintain a friction-free or low friction coupling assembly for the trailer and tractor.

Although the veneer is preferably applied to the trailer plate, it may be applied to the tractor plate. Either way, the result is a tough, long-wearing, low friction connection requiring no lubrication or maintenance.

Having thus described my invention in its best embodiment and mode of operation, what I desire to claim by Letters Patent is:

In a fifth wheel coupling assembly of the type wherein a trailer plate is connected to the front underside of a trailer and has a centrally located rigidly connected king pin projecting therefrom to be received in rotatable connection in a centrally located aperture in a tractor plate adapted for hinge mounting to a tractor and secured by a latch mechanism, the improvement comprising:

a self-lubricated veneer of polytetrafluoroethylene containing from 15 to 35 percent by weight of a filler material and having a thickness of from 0.030 to 0.250 inch secured to the bottom load-bearing surface of said trailer plate, said filler being substantially equal portions of fiberglass and carbon.

References Cited
UNITED STATES PATENTS

| | | | |
|---|---|---|---|
| 2,944,831 | 7/1960 | Thomas. | |
| 3,001,837 | 9/1961 | Lamson et al. | 308—241 X |
| 3,056,637 | 10/1962 | Shanley et al. | 308—241 X |
| 3,174,812 | 3/1965 | Widmer | 308—136 |
| 3,283,358 | 11/1966 | Merriam | 308—238 |

FOREIGN PATENTS

| | | |
|---|---|---|
| 1,351,305 | 12/1963 | France. |

OTHER REFERENCES

Twiss, S. B., et al., Friction of Polytetrafluoroethylene Dry Bearings. In Lubrication Engineering, June 1958, pp. 255–260; TJ1075.A2/L84.

LEO FRIAGLIA, *Primary Examiner.*